United States Patent
Boyle et al.

(10) Patent No.: US 6,217,771 B1
(45) Date of Patent: Apr. 17, 2001

(54) ION EXCHANGE TREATMENT OF EXTRACTION SOLVENT TO REMOVE ACID CONTAMINANTS

(75) Inventors: Joseph P. Boyle; David C. Hager, both of Baton Rouge, LA (US); Alan R. Katritzky, Gainesville, FL (US)

(73) Assignee: Exxon Research and Engineering Company, Annandale, NJ (US)

( * ) Notice: Subject to any disclaimer, the term of this patent is extended or adjusted under 35 U.S.C. 154(b) by 0 days.

(21) Appl. No.: 09/418,455

(22) Filed: Oct. 15, 1999

(51) Int. Cl.[7] .................................................. B01D 15/04
(52) U.S. Cl. .......................... 210/638; 210/660; 210/664; 210/683; 210/194
(58) Field of Search ..................... 210/660, 661, 210/664, 669, 194, 196, 638, 683

(56) References Cited

U.S. PATENT DOCUMENTS

| | | | |
|---|---|---|---|
| 2,878,182 | * | 3/1959 | Bloch . |
| 3,922,217 | * | 11/1975 | Cohen ..................................... 210/24 |
| 4,837,338 | * | 6/1989 | Krupat et al. ......................... 548/555 |
| 4,919,816 | * | 4/1990 | Tsao ...................................... 210/638 |
| 5,879,540 | * | 3/1999 | Zinke et al. .......................... 208/321 |

FOREIGN PATENT DOCUMENTS

| | | | |
|---|---|---|---|
| 2088850 | 6/1982 | (GB) | .......................... C07D/207/267 |

OTHER PUBLICATIONS

Kunin, R. "Ion Exchange Resins", Robert E. Kruger Publisher, Malabar Fl (1990) p. 337 to 344.

Mod, William A. "Ion–Exchange Agents", p. 310 in Encyclopedia of Chemical Processing and Design, vol. 27; McKetta, J. J. Ed.© 1988 Marcel Dekker, Inc., NY, NY.

De Dardel, F. and Arden, T.V. Ion Exchangers, p. 404 in Ullmann's Encyclopedia of Industrial Chemistry, 5th Edition, vol. A14; Elvers, B., Hawkins, S., Ravenscroft, J., and Schulz, G. Edts. ©1989 VCH.

* cited by examiner

Primary Examiner—Chester T. Barry
(74) Attorney, Agent, or Firm—Jay Simon

(57) ABSTRACT

A method for removing corrosive contaminants from a polar extraction solvent comprises adding water to the solvent to provide a mixture. Then the mixture is contacted with a basic ion exchanger resin to remove the corrosive contaminants. The solvent is recovered and may be reused.

8 Claims, No Drawings

ION EXCHANGE TREATMENT OF EXTRACTION SOLVENT TO REMOVE ACID CONTAMINANTS

FIELD OF INVENTION

The present invention is concerned with the treatment of polar extraction solvents to remove acid contaminants. More particularly the invention relates to the use of ion exchange resins to remove organic acid contaminants from polar extraction solvents.

BACKGROUND OF INVENTION

Solvent extraction is a process used in the petrochemical industry to separate mixtures of different molecular species by contacting the mixture with a solvent that selectively removes certain of the molecular species present in the mixture. An example of a commercial solvent extraction process involves the selective dissolution of aromatic hydrocarbons from paraffinic hydrocarbons using polar solvents such as N-methyl pyrrolidone (NMP), furfural, phenol and the like. Typically, the dissolved aromatic hydrocarbons are recovered from the solvent by rectification, stripping or a combination of these means to recover a solvent containing from about 0.5 to about 5 LV % water. The solvent then is recirculated to contact fresh feed. Over time contaminants from the feed and solvent degradation products accumulate in the solvent phase. These species are acidic and may include carboxylic acids, halogens and other products which are capable of causing severe corrosion in various sections of the plant equipment with which it comes in contact.

Therefore, there is a need for a method of treating recovered extraction solvents to remove contaminants present in them.

SUMMARY OF INVENTION

Accordingly, a method for removing corrosive contaminants from a polar extraction solvent comprises adding water to the solvent to provide a solvent and water mixture and thereafter contacting the mixture with a basic ion exchange resin to remove the contaminants.

The amount of water added to the solvent preferably is an amount sufficient to increase the exchange capacity of the resin for carboxylic acids over that in the absence of water addition.

DETAILED DESCRIPTION OF INVENTION

In the practice of the present invention water is added to a polar extraction solvent such as NMP, furfural and phenol that contains corrosive contaminants including carboxylic acids to provide a solvent and water mixture. The mixture is then contacted with a basic ion exchange resin to remove the corrosive contaminants.

The amount of water added to the solvent is an amount sufficient to increase the exchange capacity of the resin over that in the absence of water addition. For example, a recovered polar extraction solvent such as NMP generally contains no more than about 5 LV % water. This recovered solvent is diluted with water in the volume ratio of water to solvent of from about 20:1 to about 1:1 and preferably from about 5:1 to about 1:1 to provide a water and solvent mixture.

The water and solvent mixture is then contacted with a basic ion exchange resin. Both strongly and weakly basic ion exchange resins are commercially available and suitable in the practice of the present invention although a weakly basic ion exchange resin is preferred. An example of one suitable weakly basic ion exchange resin is Amberlite® IRA96.

In general the mixture is contacted with the resin by passing the mixture through a bed of resin. Typically the residence time of the mixture in the bed is in the range of about 1 to about 60 minutes and preferably between about 5 to 30 minutes at temperatures ranging from about 0° C. to about 100° C.

As a result of the contacting of the mixture with the resin the corrosive contaminants such as carboxylic acids are recovered. Then the water is substantially removed from the selective polar solvent by stripping.

The resin used may be regenerated by any conventional regeneration technique. For example, the bed of resin may be backwashed with water and then contacted with an appropriate basic solution.

Although the invention can be practiced as a batch process it offers particular advantages when used on a continuous basis. Thus, for example, in a process where aromatics are extracted from naphtha with a polar extraction solvent and in which the solvent is subsequently recovered and recycled, a slip stream of the recovered solvent may be treated in accordance with the invention. Thus, the slip stream is diluted with water, contacted with the ion exchange resin to remove contaminants. Then the water is removed from the solvent and the solvent recycled.

The following examples further illustrate the advantages of the invention.

EXAMPLES

In the examples which follow the exchange capacity of a weakly basic ion exchange resin, Amberlite® IRA96, was measured using various feeds. In these tests about 10 g of resin was packed in a burette. The resin was treated with 4% aqueous NaOH and washed with deionized water. Test feeds, described in the specific examples, were passed through the bed at a rate of about 2.3 bed volume per hour. Feed and effluent samples were analyzed for acid contaminants. From these measurements breakthrough curves were generated and the exchange capacity calculated.

Comparative Examples 1 to 4

Breakthrough measurements were conducted on the four feeds listed in Table 1. The exchange capacity for each is also given in Table 1.

TABLE 1

| Comparative Example | Feed | Exchange Capacity meq/g |
|---|---|---|
| 1 | 1000 ppm HCl in $H_2O$ | 2.16 |
| 2 | 1000 ppm HCl in NMP | 2.16 |
| 3 | 1000 ppm Acetic acid in $H_2O$ | 1.25 |
| 4 | 1000 ppm Acetic Acid in NMP | 0.53 |

As can be seen the exchange capacity for acetic acid in NMP is less than one half that in water and one quarter that of HCl from either water or NMP

Examples 1 to 3 and Comparative Examples 5 and 6

Additional breakthrough measurements were made from four feeds containing 1000 ppm acetic acid in varying amounts of NMP and water. The feeds and exchange capacity results are given in Table 2

TABLE 2

| Example | NMP/H₂O | Exchange Capacity meq/g |
|---|---|---|
| Comparative 5 | 100/0 | 0.53 |
| 1 | 40/60 | 0.95 |
| 2 | 30/70 | 1.10 |
| 3 | 20/80 | 1.15 |
| Comparative 6 | 0/100 | 1.25 |

The results demonstrate that dilution of NMP with water results in increased resin exchange capacity for acetic acid.

Example 4 and Comparative Example 7

Further breakthrough measurements were conducted. This time samples of fresh NMP and NMP that had been used in the commercial extraction of lube oils were used as feed. The commercially used NMP contained a mixture of acids including succinic and $C_1$ to $C_4$ organic acids having a total acid number as measured by KOH titration of about 0.5 mgKOH/g. This NMP was diluted 3:1 with fresh NMP in one case and with water in another case to provide two feeds of comparable acid content of about 0.12 mgKOH/g. Breakthrough experiments were conducted with each feed and the results are provided in Table 3.

TABLE 3

| Experiment | Feed | Exchange Capacity meq/g |
|---|---|---|
| 4 | NMP/H₂O 1:3 | 0.25 |
| Comparative 7 | NMP/Fresh NMP 1:3 | 0.19 |

Note the fresh resin capacity is increased by about 30% when there is water mixed with the NMP.

Example 5 and Comparative Example 8

Further breakthrough measurements were conducted on resin Amberlite® IRA96 which had been in use for several months and mixtures of (1) plant and fresh NMP, and (2) plant NMP and water were used. Breakthrough experiments were conducted with each feed on the used resin and the results are given in Table 4

TABLE 4

| Example | Feed | Exchange Capacity meq/g |
|---|---|---|
| 5 | Plant NMP H₂O 1:3 | 0.18 |
| Comparative 8 | Plant NMP/Fresh NMP 1:3 | 0.02 |

Note the used resin capacity for exchanging acids in the 100% NMP stream is negligible at 0.02 meq/g while the exchange capacity from a stream consisting of 25% NMP and 75% water and containing the same amount of acids is substantial at 0.18 meq/g.

What is claimed is:

1. A method for removing corrosive carboxylic acid contaminants from a polar extraction solvent or water mixture thereof containing less than about 5 LV % water comprising:

adding water to the solvent or water mixture thereof in the volume ratio of water to solvent or water mixture in the range of about 20:1 to about 1:1 whereby a solvent and water mixture containing greater than 5 LV % water is obtained;

contacting the mixture containing greater than 5 LV % water with a basic ion exchange resin to remove the contaminants, whereby the exchange capacity of the resin for carboxylic acids in the mixture containing greater than 5 LV % water is increased over that in the absence of water addition; and, thereafter recovering the solvent.

2. The method of claim 1 wherein the solvent is NMP.

3. The method of claim 2 wherein the ion exchange resin is a basic resin.

4. The method of claim 3 wherein the ion exchange resin is a weakly basic resin.

5. In the process of extracting aromatic hydrocarbons from a mixture with naphthenic hydrocarbons using NMP as selective solvent wherein the NMP is contacted with the mixture to extract aromatics and wherein the aromatics are removed from the NMP and the NMP is recirculated to contact a fresh mixture and wherein the NMP becomes contaminated with carboxylic acids, the improvement comprising: recovering contaminated NMP; diluting the recovered NMP with water in the volume ratio of water to NMP in the range of about 20:1 to about 1:1; contacting the diluted NMP with a basic ion exchange resin whereby carboxylic acids are removed from the NMP; and stripping the NMP to remove added water before recirculating the NMP.

6. The improvement of claim 5 wherein the volume ratio of water to NMP is in the range of 5:1 to 1:1.

7. The improvement of claim 5 wherein the diluting step comprises diluting a slip stream of said recovered NMP.

8. The improvement of claim 7 wherein the volume ratio of water to NMP is in the range of 5:1 to 1:1.

* * * * *